(12) United States Patent
Nishimura (10) Patent No.: US 9,416,889 B2
(45) Date of Patent: Aug. 16, 2016

(54) FLUID-DRIVEN SHUTOFF VALVE

(71) Applicant: CKD CORPORATION, Komaki-shi, Aichi (JP)

(72) Inventor: Yasunori Nishimura, Kasugai (JP)

(73) Assignee: CKD CORPORATION, Komaki-shi (JP)

( * ) Notice: Subject to any disclaimer, the term of this patent is extended or adjusted under 35 U.S.C. 154(b) by 139 days.

(21) Appl. No.: 14/472,764

(22) Filed: Aug. 29, 2014

(65) Prior Publication Data

US 2015/0090352 A1 Apr. 2, 2015

(30) Foreign Application Priority Data

Sep. 30, 2013 (JP) ................................. 2013-204552

(51) Int. Cl.
*F16K 23/00* (2006.01)
*F16K 31/04* (2006.01)
*F16K 31/122* (2006.01)
(Continued)

(52) U.S. Cl.
CPC ............. *F16K 31/04* (2013.01); *F16K 31/1262* (2013.01); *F16K 31/50* (2013.01); *Y10T 137/7758* (2015.04)

(58) Field of Classification Search
CPC ....... F16K 23/00; F16K 31/04; F16K 31/122; F16K 31/1221; F16K 31/1223; F16K 31/126; F16K 31/1262; F16K 31/1266; F16K 31/50; Y10T 137/7758; Y10T 137/7761; Y10T 137/7762; Y10T 137/7765; Y10T 137/7768; Y10T 137/777; B05B 1/28
USPC .......... 239/63, 106, 118, 119, 569, 583, 586; 137/485, 487.5, 488, 489, 490, 492, 137/492.5; 251/28, 29, 30.01, 63.5; 222/571
See application file for complete search history.

(56) References Cited

U.S. PATENT DOCUMENTS 5,931,384 A * 8/1999 Fukano .................... B05B 1/28
222/571
5,971,296 A * 10/1999 Fukano .................... B05B 1/28
222/571
(Continued)

FOREIGN PATENT DOCUMENTS

JP          A-5-346185     12/1993
JP          A-11-82763      3/1999
(Continued)

OTHER PUBLICATIONS

Nov. 5, 2015 Korean Office Action issued in Korean Patent Application No. 10-2014-0128160.

*Primary Examiner* — Darren W Gorman
(74) *Attorney, Agent, or Firm* — Oliff PLC (57) ABSTRACT

An air-driven shutoff valve includes a valve seat formed in a main body, a valve element movable into or out of contact with the valve seat, a drive part integrally connected to the valve element, and a pilot opening/closing valve configured to supply compressed fluid to drive the drive part. The pilot opening/closing valve includes (a) a first needle valve, a first motor to change an opening degree of the first needle valve, and a first check valve allowing the compressed fluid to flow only from a pilot opening/closing valve side to a drive part side, and (b) a second needle valve, a second motor to change an opening degree of the second needle valve, and a second check valve allowing the compressed fluid to flow only from the drive part side to the pilot opening/closing valve side.

6 Claims, 11 Drawing Sheets

(51) Int. Cl.
   *F16K 31/126* (2006.01)
   *F16K 31/50* (2006.01)

(56) References Cited

U.S. PATENT DOCUMENTS

| | | | | |
|---|---|---|---|---|
| 5,988,524 | A * | 11/1999 | Odajima | G05D 7/005 222/571 |
| 6,176,438 | B1 * | 1/2001 | Sato | B05C 11/1026 222/571 |
| 2002/0036013 | A1 * | 3/2002 | Inayama | G05D 16/2093 137/487.5 |
| 2005/0253100 | A1 * | 11/2005 | Yasue | F16K 1/523 251/63 |
| 2005/0284954 | A1 * | 12/2005 | Fukano | F16K 23/00 239/119 |
| 2005/0284955 | A1 * | 12/2005 | Fukano | F16K 23/00 239/119 |
| 2010/0207048 | A1 * | 8/2010 | Inoue | F16K 23/00 251/331 |

FOREIGN PATENT DOCUMENTS

| JP | A-2004-138178 | 5/2004 |
|---|---|---|
| JP | A-2010-223264 | 10/2010 |
| JP | B2-5061258 | 10/2012 |

\* cited by examiner

FLUID-DRIVEN SHUTOFF VALVE

CROSS-REFERENCE TO RELATED APPLICATIONS

This application is based upon and claims the benefit of priority from the prior Japanese Patent Application No. 2013-204552 filed on Sep. 30, 2013, the entire contents of which are incorporated herein by reference.

BACKGROUND OF THE INVENTION

1. Field of the Invention

The present invention relates to a fluid-driven shutoff valve including a valve seat formed in a main body, a valve element movable into or out of contact with the valve seat, a drive part integrally coupled with the valve element, and a pilot opening/closing (on/off) valve configured to supply compressed fluid to drive the drive part.

2. Related Art

As a resist supplying device of a semiconductor manufacturing apparatus, conventionally, there is used a device integrally including a suck-back valve and an air-driven shutoff valve. For a resist supplying process, there is a demand for control of an amount of resist to be supplied with high precision. For this purpose, it would be necessary to control movements of a diaphragm valve element of the air-driven shutoff valve (opening-closing control). For example, see Patent Document 1. In this case, the opening-closing control of the air-driven shutoff valve is performed by use of an electropneumatic regulator. This electropneumatic regulator generally includes an electromagnetic valve for air supply and an electromagnetic valve for air discharge and is configured to adjust secondary pressure to be constant by an electric signal in order to appropriately control primary pressure to be supplied to the electropneumatic regulator.

The electropneumatic regulator is controlled to control the movement of the diaphragm valve element to thereby reduce water hammer phenomenon which will be generated by the diaphragm valve element.

RELATED ART DOCUMENTS

Patent Documents

Patent Document 1: JP-A-5(1993)-346185
Patent Document 2: JP-A-11(1999)-82763
Patent Document 3: JP-A-2004-138178
Patent Document 4: Japanese Patent 5061258
Patent Document 5: JP-A-2010-223264

SUMMARY OF INVENTION

Problems to be Solved by the Invention

However, the conventional air-driven shutoff valve causes the following disadvantages. Specifically, it takes long to start moving the diaphragm valve element after input of a valve-closing or valve-opening signal, resulting in a long treatment process.

Repeatability of the opening-closing time of the diaphragm valve element depends on the control accuracy of the electropneumatic regulator. Accordingly, when the diaphragm valve element is to be closed, the repeatability of the opening-closing time of the diaphragm valve element would vary. This opening-closing time represents a moving speed at the timing of starting valve opening and at the timing of starting valve closing. In recent years, the demand for resist supply accuracy has been increased. Thus, a variation in the accuracy is a problematic issue. This would lead to variations in relative relationship with the movement of the suck-back valve.

Long-term use of the electropneumatic regulator would cause heat generation. If a resin main body of the suck-back valve is deformed due to the heat generation of the electropneumatic regulator, this deformation causes the above variations. The heat generation of the electropneumatic regulator will also cause changes in the characteristics of a resist liquid.

When the diaphragm valve is to be separated from the valve seat to open, the response is slow and thus a long time is required for the treatment process. Further, since the repeatability is poor and a response time varies, a problem with variation in the amount of the resist to be supplied would be raised.

The present invention has been made to solve the above problems and has a purpose to provide a fluid-driven shutoff valve capable of increasing the repeatability of the opening-closing time of a diaphragm valve element and also speeding up the responsiveness of the diaphragm valve element at each of opening time and closing time.

Means of Solving the Problems

To achieve the above purpose, one aspect of the invention provides a fluid-driven shutoff valve including: a main body formed with an inlet passage and an outlet passage; a valve seat formed in the main body; a valve element movable into or out of contact with the valve seat; a drive part integrally connected to the valve element; and a pilot opening/closing valve configured to supply compressed fluid to drive the drive part, wherein the pilot opening/closing valve includes: (a) a first needle valve, a first motor configured to change an opening degree of the first needle valve, and a first check valve configured to allow the compressed fluid to flow only from the pilot opening/closing valve side to the drive part side, and (b) a second needle valve, a second motor configured to change an opening degree of the second needle valve, and a second check valve configured to allow the compressed fluid to flow only from the drive part side to the pilot opening/closing valve side, wherein each of the first and second needle valves includes a needle valve element and a needle valve seat, and the shutoff valve further includes a vertically-moveable member placed between the first motor and the first needle valve, and a vertically-moveable member placed between the second motor and the second needle valve, each of the vertically-movable members being to be moved by driving of the corresponding first and second motors to relatively move the respective needle valve elements with respect to the needle valve seats.

The above fluid-driven shutoff valve can provide the following operations and effects. The responsiveness achieved by moving the valve element into or out of contact with the valve seat for valve closing or opening can be speeded up, enabling shortening a treatment process time. The driving of the pilot opening/closing valve can be made under speed control using the needle valve, not pressure control using the electropneumatic regulator. Therefore, variations in opening/closing times of the diaphragm valve element can be reduced and thus the relative relationship with the suck-back valve can be stabilized. It is further possible to speed up the responsiveness to bring the diaphragm valve element out of contact with the valve seat for valve opening.

Further, the responsiveness achieved by moving the valve element into or out of contact with the valve seat for valve closing or opening can be speeded up, enabling shortening a treatment process time.

In the above fluid-driven shutoff valve, preferably, a piston of the drive part is a diaphragm type, and the first and second motors are stepping motors. According to the above fluid-driven shutoff valve, the piston is low in sliding resistance and high in controllability. Since the stepping motor is compact and inexpensive, total cost of the fluid-driven shutoff valve can be reduced.

In the above fluid-driven shutoff valve, preferably, the fluid-driven shutoff valve is integrally formed with a suck-back valve having an inlet passage, the outlet passage of the fluid-driven shutoff valve being communicated with the inlet passage of the suck-back valve, and the fluid-driven shutoff valve is configured to be operated in sync with the suck-back valve. According to the above fluid-driven shutoff valve, the operation timing of the fluid-driven shutoff valve and the operation timing of the suck-back valve can be matched with each other. The fluid-driven shutoff valve according to the invention can provide high responsiveness and high repeatability and thus enables repeatedly controlling a supply amount by the suck-back valve in a short time. The drive part of the fluid-driven shutoff valve does not generate heat, different from the electropneumatic regulator. Thus, the main body made of resin is not deformed and no change appears in the characteristics of the resist liquid due to heat. This makes it possible to stabilize the resist amount to be supplied.

Preferably, the above fluid-driven shutoff valve further includes: a nozzle communicated with an outlet passage of the suck-back valve, and a sensor placed at a distal end of the nozzle and configured to detect a state of a fluid in the nozzle, wherein the shutoff valve is configured to change the opening degree of the first needle valve based on a detected result of the sensor to adjust a closing speed of the diaphragm valve element, and the shutoff valve is configured to change the opening degree of the second needle valve based on the detected result of the sensor to adjust an opening speed of the diaphragm valve element. According to this fluid-driven shutoff valve, the opening degree of the needle valve can be automatically adjusted by remote control.

DESCRIPTION OF EMBODIMENTS

Figure 1:
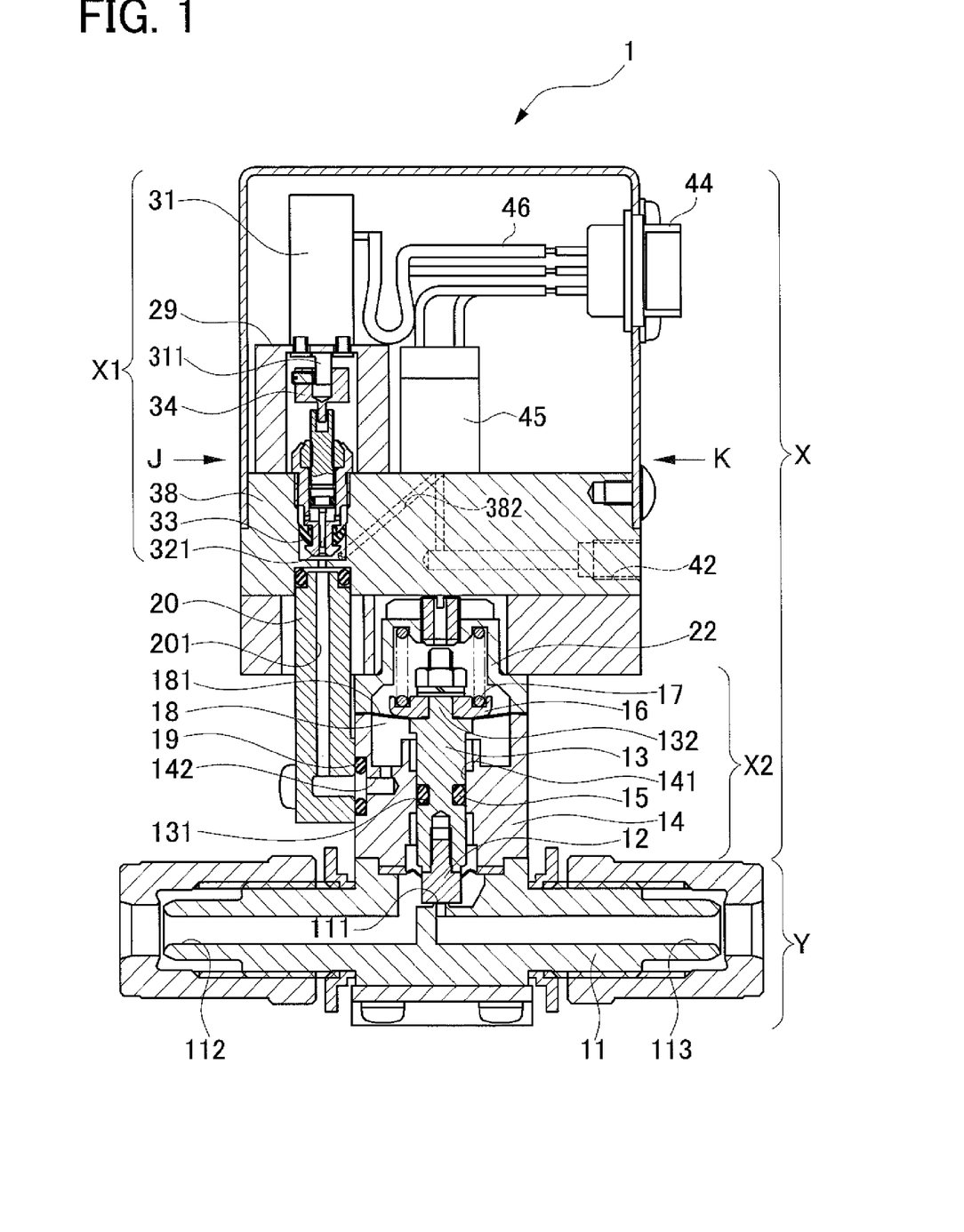
FIG. 1 is a cross sectional view of an air-driven shutoff valve in a first embodiment according to the present invention.
Figure 2:
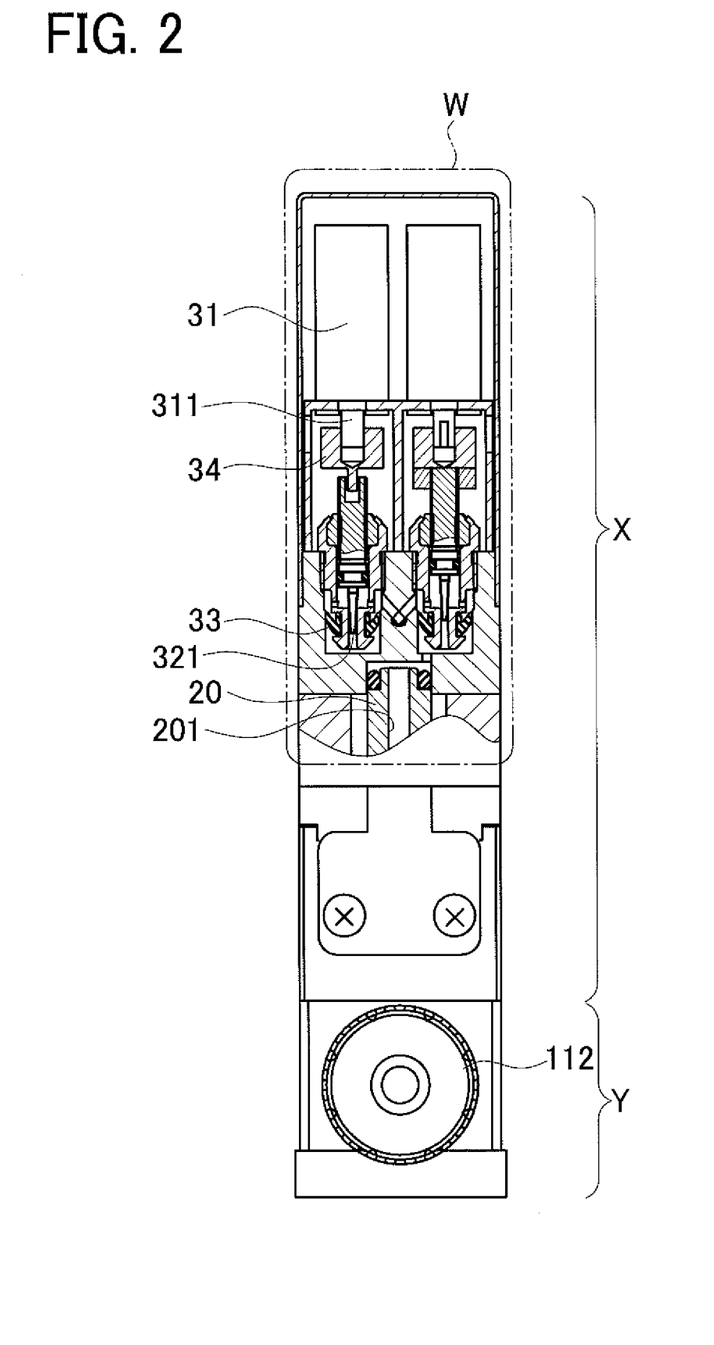
FIG. 2 is a view seen in the direction of arrow J in FIG. 1.
Figure 3:
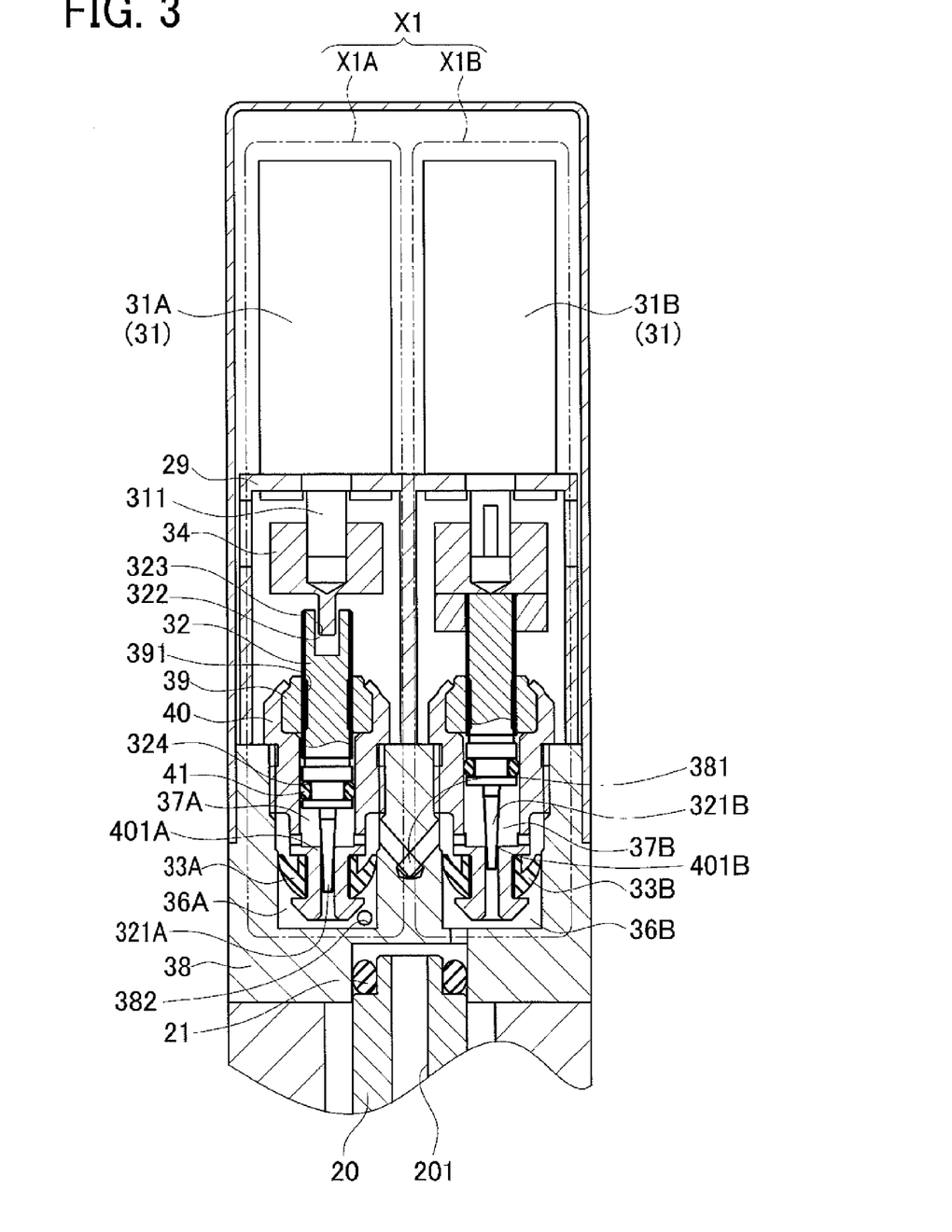
FIG. 3 is a partially enlarged view of FIG. 2.
Figure 4:
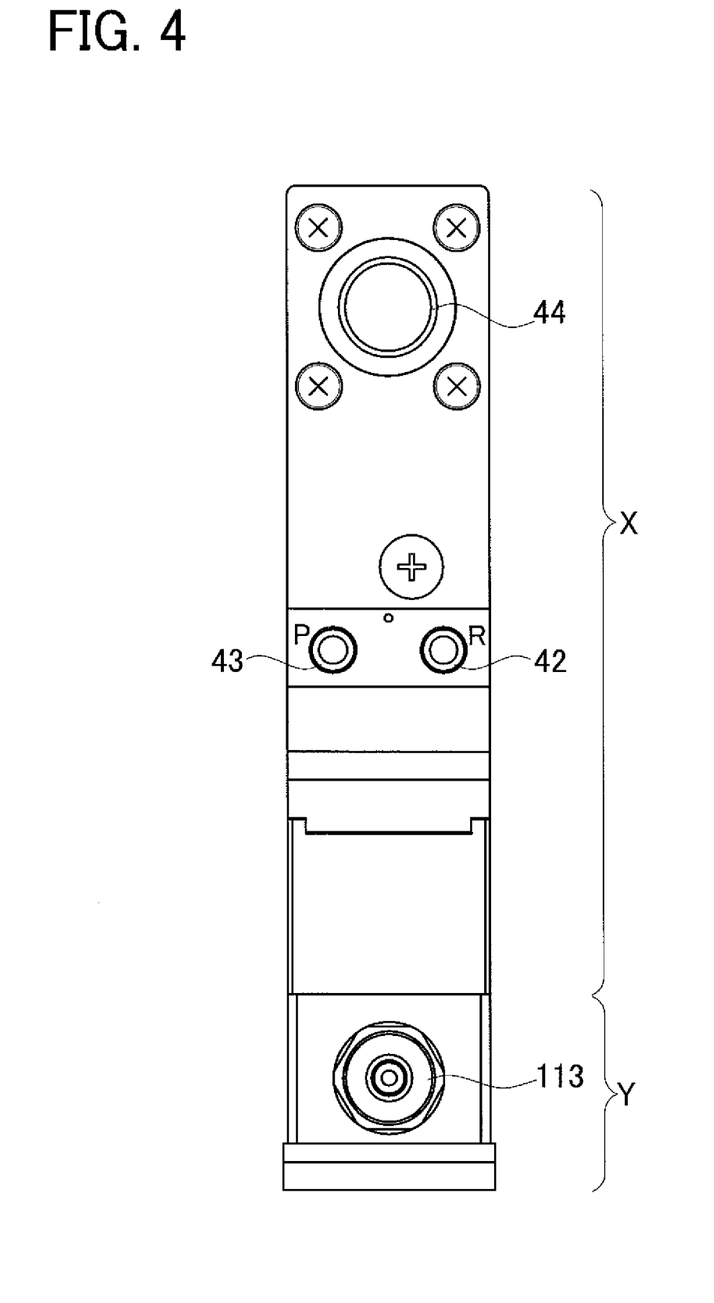
FIG. 4 is a view seen in the direction of arrow K in FIG. 1.
Figure 5:
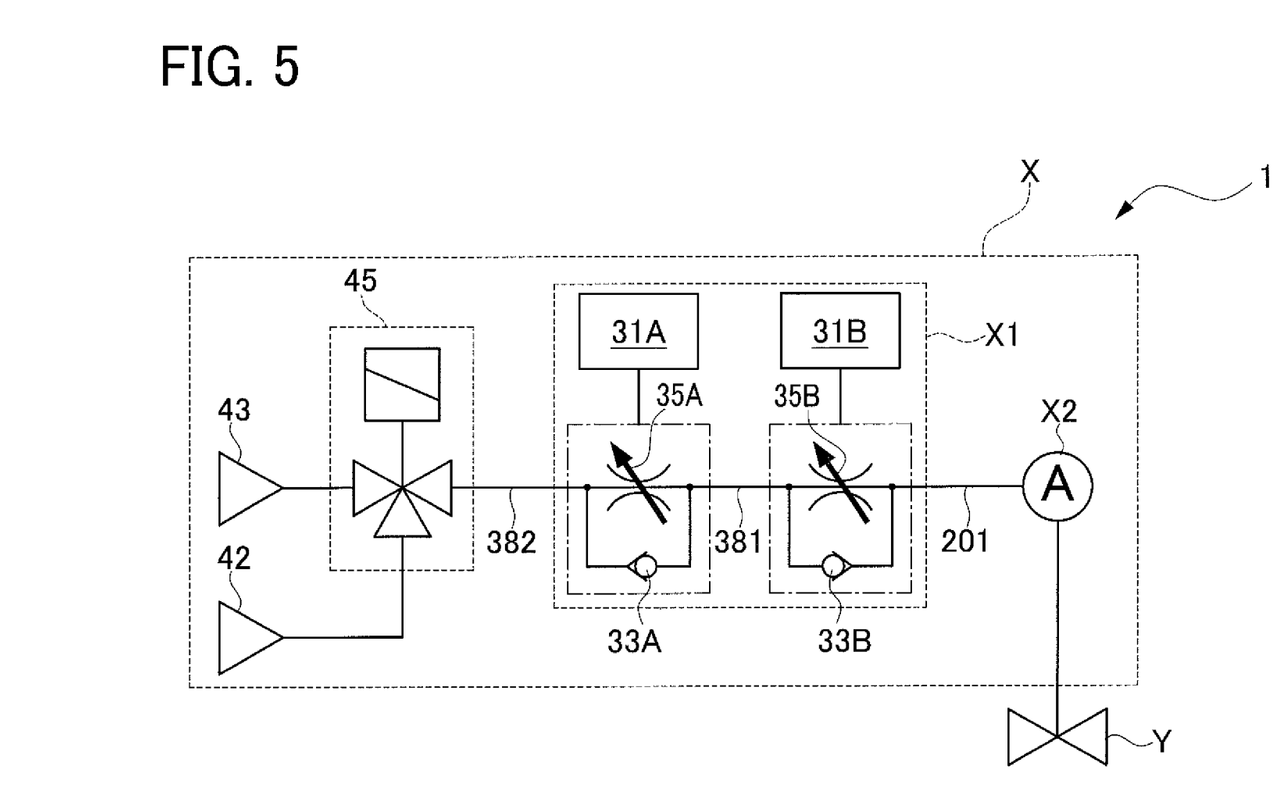
FIG. 5 is an air circuit diagram of the air-driven shutoff valve.

A detailed description of a first embodiment of a fluid-driven shutoff valve according to the present invention will now be given referring to the accompanying drawings. FIG. 1 is a cross sectional view of an air-driven shutoff valve which is the fluid-driven shutoff valve in the first embodiment. FIG. 2 is a fragmentary cross sectional view seen in the direction of arrow J in FIG. 1. FIG. 3 is an enlarge view of a part W in FIG. 2. FIG. 4 is a view seen in the direction of arrow K in FIG. 1. FIG. 5 is an air circuit diagram of the air-driven shutoff valve.

First Embodiment

Air Circuit of Air-Driven Shutoff Valve

An air circuit of an air-driven shutoff valve 1 will be first explained referring to FIG. 5.

The air circuit of the air-driven shutoff valve 1 is configured such that an air supply port 43, an opening/closing valve 45 which is a three-way valve, a needle valve 35A, a needle valve 35B, and an air drive part X2 are connected in series. The needle valves 35A and 35B are respectively connected in parallel to check valves 33A and 33B. The check valve 33A allows passage of only the air flowing from a pilot opening/closing valve X1 side toward the air drive part X2 side. The check valve 33B allows passage of only the air flowing from the air drive part X2 side toward the pilot opening/closing valve X1 side. The needle valves 35A and 35B are respectively connected to motors 31A and 31B. Those motors 31A, 31B, needle valves 35A and 35B, and check valves 33A and 33B constitute the pilot opening/closing valve X1.

Air will be supplied through the air supply port 43 to the pilot opening/closing valve X1 via the opening/closing valve 45. This air mainly passes through the check valve 33A. Since the check valve 33B does not permit passage of this air flow, the air thus passes through the needle valve 35B and flows to an air drive part X2.

On the other hand, when the air is to be discharged from the air drive part X2 through the opening/closing valve 45, the air mainly passes through the check valve 33B. Since the check valve 33A does not permit this air flow, the air thus passes through the needle valve 35A and flows out of the shutoff valve 1 through an air discharge port 42.

Configuration of Air-Driven Shutoff Valve

The concrete configuration of the air-driven shutoff valve 1 to achieve the air circuit shown in FIG. 5 will be explained below. The air-driven shutoff valve 1 includes a shutoff-valve drive part X and a main valve part Y as shown in FIG. 1.

The main valve part Y has a body 11. This body 11 is formed with an inlet passage 112 through which a resist liquid flows in the shutoff valve 1 and an outlet passage 113 through which the resist liquid flows out of the shutoff valve 1. The body 11 is formed, at its center, with a valve seat 111.

The shutoff-valve drive part X includes the pilot opening/closing valve X1 and the air drive part X2.

The air drive part X2 includes a body lower member 14 formed with a drive valve chamber 18 and a cylinder 141, and a body upper member 22. A drive member 13 is held between the body lower member 14 and the body upper member 22. The drive member 13 is slidable within the cylinder 141. A diaphragm valve element 12 is held between the body lower member 14 and the body 11 so as to come into or out of contact with the valve seat 111.

An upper part of the diaphragm valve element 12 is integrally connected to the drive member 13. The drive member 13 is formed, on its outer periphery, with a recess 131 in which an O ring 15 is mounted to prevent leakage of air. A top of the drive member 13 is formed with a protrusion 132. A spring retainer 16 is fitted on the protrusion 132 and presses an inner circumferential part of a diaphragm 181 against the drive member 13. A spring 17 has one end that abuts on an upper surface of the spring retainer 16 and the other end that abuts on the body upper member 22. An outer circumferential part of the diaphragm 181 is held between the body upper member 22 and the body lower member 14. The body lower member 14, the drive member 13, and the diaphragm 181 define the drive valve chamber 18. In the present embodiment, the spring retainer 16, the diaphragm 181, and the drive member 13 constitute one example of a piston of the invention. Under the drive valve chamber 18, the body lower member 14 is formed with a passage 142 communicating with the drive valve chamber 18. To one side surface of the body lower member 14, a passage body 20 internally formed with a passage 201 is attached in contact therewith through an O ring 19. Those passages 201 and 142 are thus communicated to each other.

The pilot opening/closing valve X1 includes two pilot opening/closing valves X1A and X1B arranged in parallel as shown in FIGS. 2 and 3. These pilot valves X1A and X1B are identical in configuration. The pilot valve X1A is placed on the side close to the opening/closing valve 45 and the pilot valve X1B is placed on the side close to the air drive part X2. The pilot valve X1 is operated to supply and discharge air to drive the drive member 13 to and from the air drive part X2.

The pilot opening/closing valves X1A and X1B are basically identical in structure. Thus, only the pilot opening/closing valve X1A will be explained below referring to FIG. 3 to avoid repeating explanation of the pilot opening/closing valve X1B.

The pilot opening/closing valve X1 (X1A) has a body 38 in which a fixed member 40 is fixed. A cover 29 is attached to an upper surface of the body 38. On an upper surface of the cover 29, furthermore, there is attached a motor 31 (31A). It is to be noted that a tailing alphabet of each reference sign of the members or parts (e.g., "A" of the motor 31A) is omitted for facilitating the explanation. A driver 34 is attached on an output shaft 311 of the motor 31. The driver 34 is engaged with a groove 322 formed at the top of a vertically-moveable member 32. This member 32 is formed with male screw-threads 323 on an outer peripheral surface. The male screw-threads 323 are engaged with female screw-threads 391 formed on an inner peripheral surface of a female screw member 39. Clockwise rotation of the driver 34 causes the vertically-moveable member 32 to move downward. Counterclockwise rotation of the driver 34 causes the vertically-moveable member 32 to move upward.

The female screw member 39 is integrally fitted in the upper part of the fixed member 40. A lower part of the vertically-moveable member 32 is formed with a needle valve element 321 having a taper shape whose diameter decreases toward a distal end. The fixed member 40 is formed with a needle valve seat 401. The motor 31 is driven to change an opening degree between the needle valve element 321 and the needle valve seat 401. Specifically, the vertically-moveable member 32 is moved up/down by the motor 31, thereby relatively moving the valve element 321 with respect to the valve seat 401. Relative movement of the valve element 321 with respect to the valve seat 401 causes a change in clearance between the valve element 321 and the valve seat 401, thereby changing the opening degree. These valve element 321 and valve seat 401 constitute a needle valve 35. Since the opening degree of the needle valve 35 is remotely-operated by driving the motor 31, it is possible to adjust the opening/closing speed of the diaphragm valve element 12 to come into or out of contact with the valve seat 111 in the main valve part Y by remove control.

A groove 324 is circumferentially formed in an outer peripheral surface of a lower portion of a middle part of the vertically-moveable member 32. In this groove 324, an O ring 41 is mounted to prevent air leakage. The fixed member 40 has a reduced-diameter portion on a lower side, on the outer peripheral surface of which the check valve 33 is attached. The check valve 33 has an umbrella-like shape (in a reversed orientation in FIGS. 2 and 3) having a lip portion extending radially outward and is elastically deformable. Of the check valves 33, the check valve 33A only allows an airflow to go from the opening/closing valve 45 toward the drive valve chamber 18 of the air drive part X2 and the check valve 33B only allows an airflow to go from the drive valve chamber 18 toward the opening/closing vale 45.

On one side surface of the body 38, the passage body 20 is attached in contact therewith through an O ring 21. The passage 201 of the passage body 20 is communicated with a second passage 36B formed in the body 38. The second passage 36B and a first passage 37B formed in the body 38 are communicated with each other through the check valve 33B and the needle valve 35B (corresponding to a needle valve element 321B and a needle valve seat 401B). Furthermore, the first passage 37B of the pilot opening/closing valve X1B and the first passage 37A of the pilot opening/closing valve X1A are communicated through a V-shaped passage 381 formed in the body 38. The first passage 37A and the second passage 36A are communicated through the check valve 33A and the needle valve 35A (corresponding to a needle valve element 321A and a needle valve seat 401A). Thus, the second passage 36A is communicated with a passage 382 shown in FIG. 1 and further with the air supply port 43 or the air discharge port 42 through the opening/closing valve 45.

As shown in FIG. 1, a connector 44 is placed on the side surface of the shutoff valve drive part X and has ten cables 46. These cables 46 are connected to the motors 31 (31A and 31B) and the opening/closing valve 45. Below the connector 44, as shown in FIG. 4, the air supply port 43 and the air discharge port 42 are arranged.

As shown in FIG. 3, the needle valve element 321A and the needle valve seat 401A of the pilot opening/closing valve X1A (which correspond to the needle valve 35A in FIG. 5) are one example of a first needle valve of the invention. The motor 31A is one example of a first motor of the invention. The check valve 33A is one example of a first check valve of the invention. The needle valve element 321B and the needle valve seat 401B of the pilot opening/closing valve X1B (which correspond to the needle valve 35B in FIG. 5) are one example of a second needle valve of the invention. The motor 31B is one example of a second motor of the invention. The check valve 33B is one example of a second check valve of the invention. The main valve part Y is one example of a main body of the invention. The drive member 13 is one example of a drive part of the invention.

Operations and Effects of Air-Driven Shutoff Valve

The closing operation of the air-driven shutoff valve 1 will be first explained. This closing operation is an operation of shifting the air-driven shutoff valve 1 from an open state to a closed state. When the air discharge port 42 is communicated with the passage 382 by changeover of the opening/closing valve 45 shown in FIG. 1 to discharge air, the air filled in the drive valve chamber 18 is allowed to flow into the second passage 36A of the pilot opening/closing valve X1A through the passage 142 and the passage 201. To be more concrete, as shown in FIG. 3, the pressure of the air flowing from below to above in the pilot opening/closing valve X1B acts to elastically deform the lip portion of the check valve 33B radially inward, thereby allowing communication between the second passage 36B and the first passage 37B. Thus, the air to be discharged will flow from the second passage 36B to the first passage 37B mainly via the check valve 33B.

The air then flows from the first passage 37B to the first passage 37A of the pilot opening/closing valve X1A through the V-shaped passage 381. At that time, the pressure of the air flowing from above to below acts to elastically deform the lip portion of the check valve 33A radially outward, thereby closing off communication between the first passage 37A and the second passage 36A. On the other hand, the needle valve element 321A is placed in advance in a predetermined position by the motor 31A and is not moved any more under normal conditions. Thus, a predetermined gap is formed between the needle valve element 321A and the needle valve seat 401A, generating a flow path. This flow path formed by the needle valve seat 401A allows the air to gradually flow from the first passage 37A to the second passage 36A. The air passing through the second passage 36A, the flow passage 382, and the opening/closing valve 45 is thus discharged out through the air discharge port 42.

Figure 6:
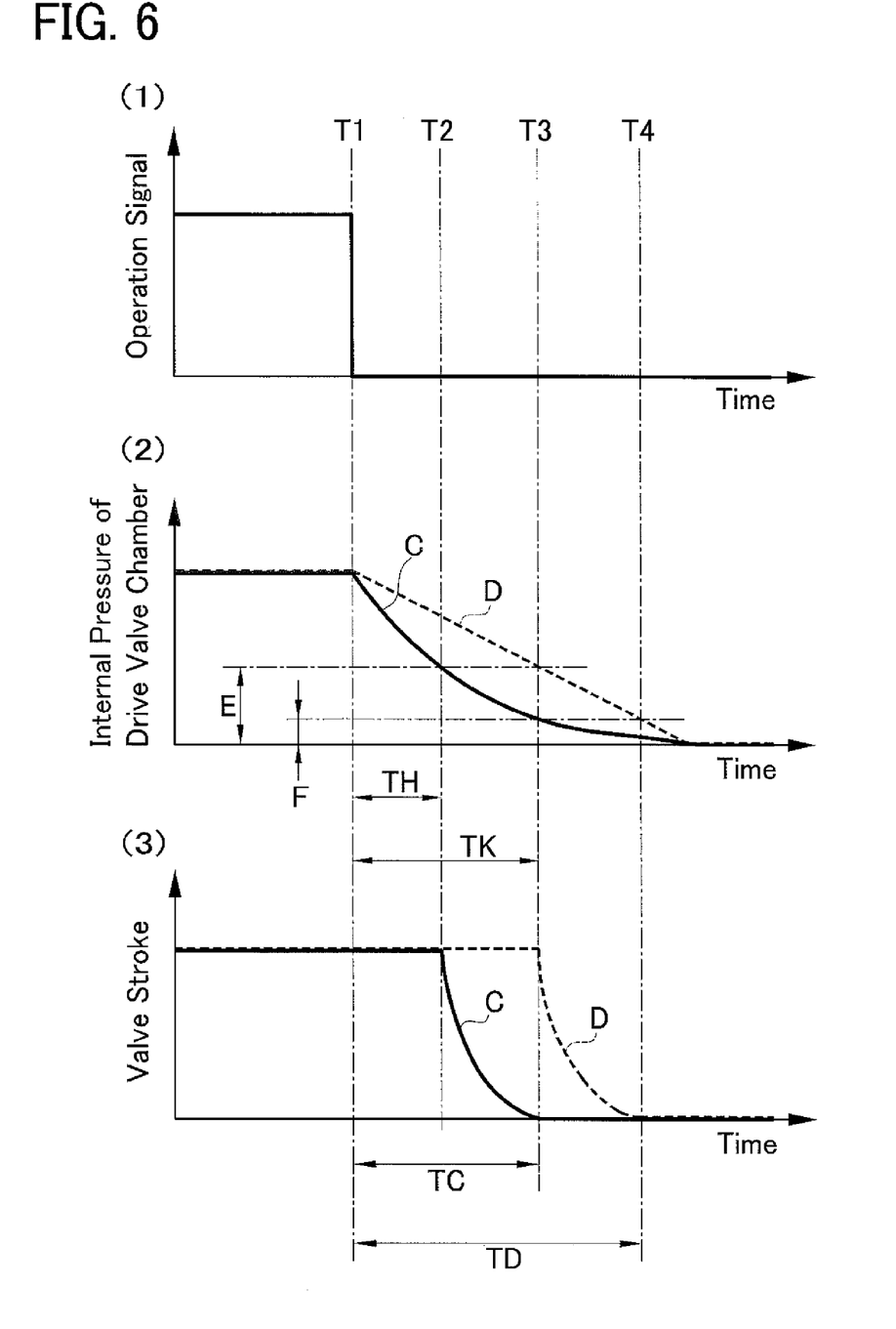
FIG. 6 is a chart showing a speed of a closing operation of the air-driven shutoff valve.

Herein, the speed of the closing operation of the air-driven shutoff valve 1 in the present embodiment will be explained referring to FIG. 6 by comparison with a conventional shutoff valve operated under pressure control using an electropneumatic regulator. In three graphs in FIG. 6, a vertical axis indicates (1) operation signal, (2) internal pressure of the drive valve chamber, and (3) valve stroke of the diaphragm valve element, and a lateral axis of all the graphs indicates time. Solid lines C in the graphs (2) and (3) represent the air-driven shutoff valve 1 of the present embodiment and broken lines D represent the conventional shutoff valve under pressure control using the electropneumatic regulator.

Regarding the conventional shutoff valve, when the operation signal is changed from an air supply signal to an air discharge signal at time T1 in the graph (1), the internal pressure of the drive valve chamber starts to decrease linearly as shown in the graph (2). When the internal pressure reaches a pressure value at which the diaphragm valve element starts to move downward, that is, a threshold E, the valve stroke of the diaphragm valve element starts to decrease as shown in the graph (3). Specifically, in the conventional shutoff valve, the internal pressure of the drive valve chamber reaches the threshold E at time T3 and the valve stroke decreases therefrom. Subsequently, when the internal pressure reaches a pressure value corresponding to the moment when the diaphragm valve element contacts with the valve seat, that is, a threshold F, the shutoff valve comes to the closed state. Specifically, in the case of the conventional shutoff valve, the internal pressure reaches the threshold F at time T4 and the shutoff valve comes to the closed state. A period of time from the changing of the operation signal to before the valve stroke starts to change is indicated by TK. Further, a period of time from the changing of the operation signal to when the shutoff valve comes to the closed state is indicated by TD.

In the air-driven shutoff valve 1 of the present embodiment, on the other hand, when the operation signal is changed from the air supply signal to the air discharge signal at time T1 in the graph (1), the internal pressure of the drive valve chamber 18 decreases like a pressure drop curve depicted when the inside of the chamber 18 is released (communicated) to atmosphere through the needle valve 35, the air initially flows out of the chamber 18 at a stroke, resulting in a sharp decrease in the internal pressure of the chamber 18 as shown in the graph (2). Thus, the internal pressure of the chamber 18 reaches the threshold E at time T2 earlier than that of the conventional shutoff valve. During a period from time T2 to time T3, i.e., during the closing operation, the internal pressure of the chamber 18 shown in FIG. 6 (2) decreases at the same decline as the internal pressure of the drive valve chamber of the conventional shutoff valve. Furthermore, the internal pressure of the chamber 18 reaches the threshold F at time T3 earlier than that of the conventional shutoff valve and the shutoff valve 1 comes to the closed state. A period of time from the changing of the operation signal and to before the valve stroke starts to change is indicated by TH. Further, a period of time from the changing of the operation signal to when the shutoff valve 1 comes to the closed state is indicated by TC.

The above results reveal that, as compared with the conventional shutoff valve, the air-driven shutoff valve 1 of the present embodiment could reduce a time required from the changing of the operation signal to the starting to change the valve stroke to about a half (TH/TK) and reduce also a time required until the shutoff valve comes to the closed state to about two thirds (TC/TD). Accordingly, the air-driven shutoff valve 1 of the present embodiment is operated with high responsiveness after the changing of the operation signal. This can speed up the response to bring the diaphragm valve element 12 into contact with the valve seat 111 to thereby close the shutoff valve 1. The air-driven shutoff valve 1 of the present embodiment can be operated with a faster response time than the electropneumatic regulator.

The opening operation of the air-driven shutoff valve 1 will be explained below. This opening operation is an operation of shifting the air-driven shutoff valve 1 from the closed state to the open state. As shown in FIG. 4, the air supplied to the shutoff valve 1 through the air supply port 43 flows into the second passage 36A of the pilot opening/closing valve X1A through the opening/closing valve 45 and the passage 382. The pressure of the air flowing from below to above acts to elastically deform the lip portion of the check valve 33A radially inward, thereby allowing communication between the second passage 36A and the first passage 37A. While the air is being supplied to the second passage 36A, the check valve 33A continues to be elastically deformed, maintaining the communication. The needle valve element 321A is positioned in advance in a predetermined position by the motor 31A. A predetermined gap is formed between the needle valve element 321A and the needle valve seat 401A, generating a flow path. The air to be supplied will flow from the second passage 36A to the first passage 37A mainly via the check valve 33A.

Then, the air flows from the first passage 37A to the first passage 37B of the pilot opening/closing valve X1B through the V-shaped passage 381. At that time, the pressure of the air flowing from above to below acts to elastically deform the lip portion of the check valve 33B radially outward, thereby closing off communication between the first passage 37B and the second passage 36B. The needle valve element 321B is placed in advance in a predetermined position by the motor 31B. Thus, a predetermined gap is formed between the needle valve element 321B and the needle valve seat 401B, generating a flow path. This flow path formed by the needle valve seat 401B allows the air to gradually flow from the first passage 37B to the second passage 36B. The air passing through the second passage 36B, the passage 201, and the passage 142 is thus supplied to the drive valve chamber 18. When the inside of the drive valve chamber 18 is filled with the air and the force deriving from the air pressure exceeds the biasing force of the spring 17, the spring 17 is compressed, thereby moving the drive member 13 upward. In association with this movement, the diaphragm valve element 12 is separated from the valve seat 111 to establish the valve open state, thereby allowing the resist liquid to flow from the inlet passage 112 to the outlet passage 113.

Figure 7:
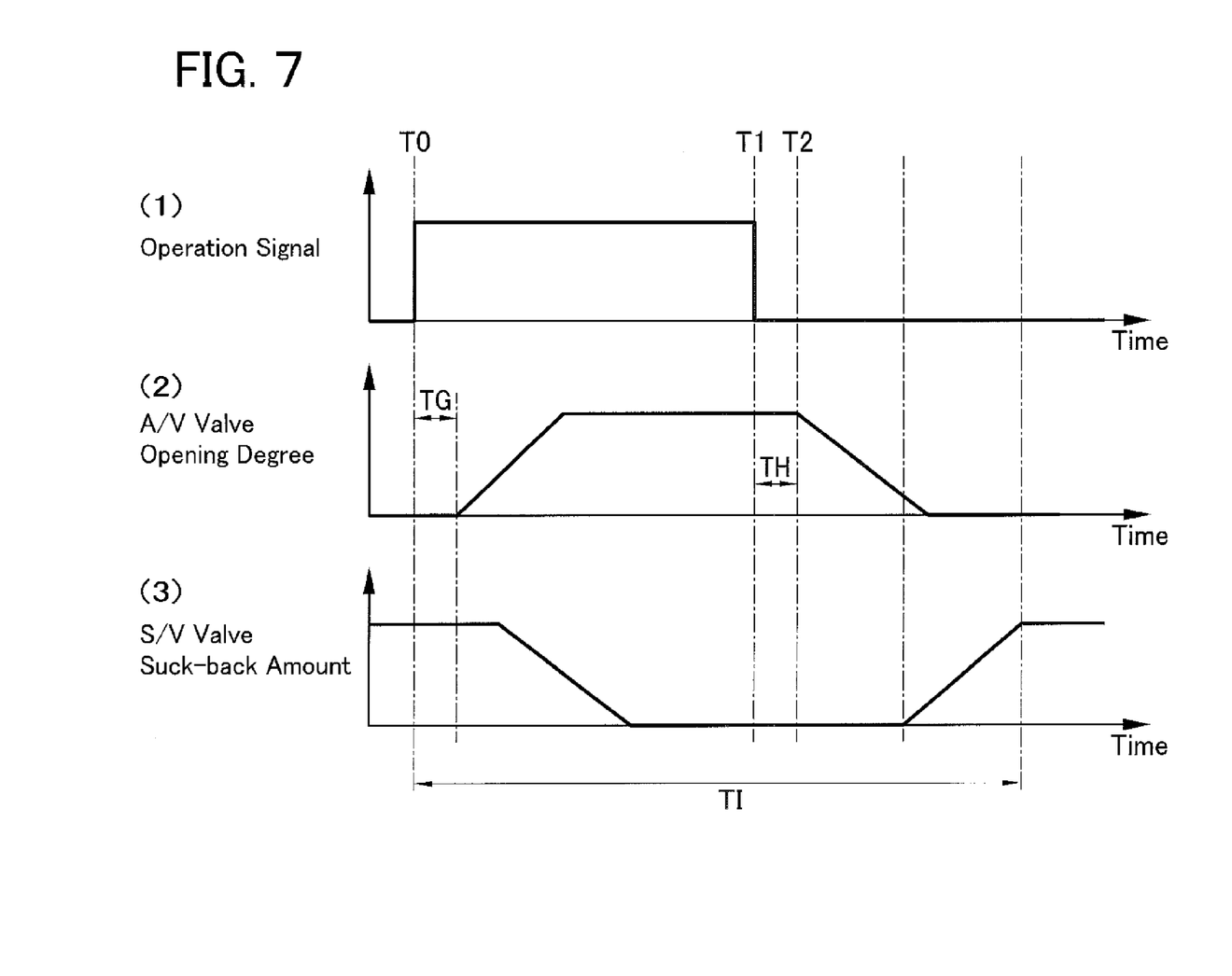
FIG. 7 is a chart showing a speed of opening and closing operations of the air-driven shutoff valve.
Figure 8:
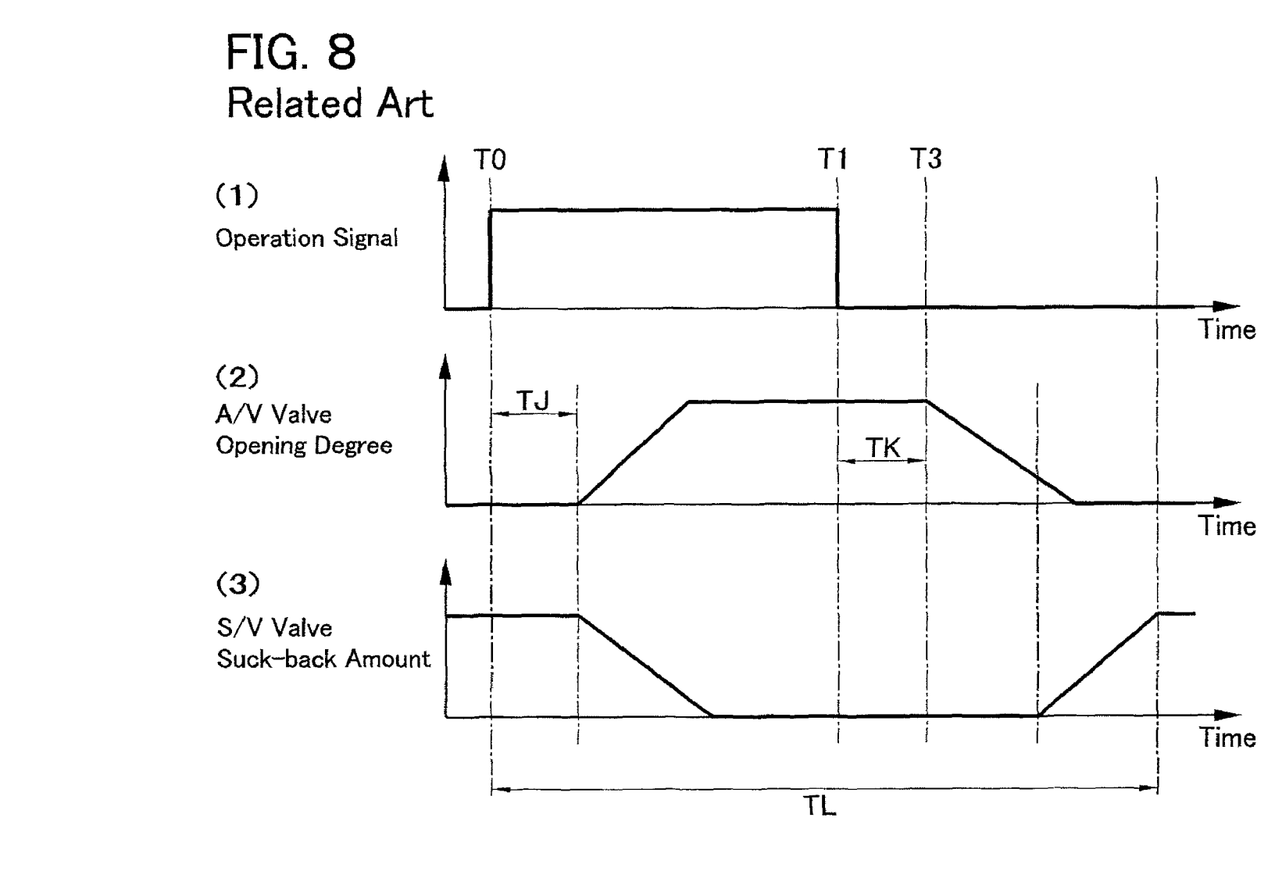
FIG. 8 is a chart showing a speed of opening and closing operations of a conventional air-driven shutoff valve.

Herein, the operation speed of the whole air-driven shutoff valve 1 will be explained referring to FIGS. 7 and 8 by comparison with the conventional shutoff valve using the electropneumatic regulator. FIG. 7 is a chart showing opening and closing speeds using the air-driven shutoff valve 1 of the present embodiment. FIG. 8 is a chart showing opening and closing speeds using the conventional shutoff valve using the electropneumatic regulator. In three graphs in FIGS. 7 and 8, a vertical axis indicates (1) operation signal, (2) opening degree of a shutoff valve (A/V valve), and (3) a suck-back amount of the suck-back valve (S/V valve), and a lateral axis of all the graphs indicates time.

When the operation signal is changed from an air supply signal to an air discharge signal at time T0, the conventional shutoff valve requires the time to increase the supply pressure under electrical control using the electropneumatic regulator. Specifically, it takes a time TJ until the shutoff valve starts the opening operation. In contrast, the air-driven shutoff valve 1 of the present embodiment comes to a pressure supply state concurrently with the changeover of the opening/closing valve 45, so that it takes a time TG until the shutoff valve 1 starts the opening operation. In the shutoff valve 1, therefore, the time TG can be shortened to about a half of the time TJ. This can speed up the response to separate the diaphragm valve element 12 from the valve seat 111 for valve opening and the response to bring the diaphragm valve element 12 into contact with the valve seat 111 for valve closing.

As explained above referring to FIG. 6, when the operation signal is changed from the air supply signal to the air discharge signal, the conventional shutoff valve takes the time TK until the shutoff valve starts the valve closing operation. On the other hand, the air-driven shutoff valve 1 of the present embodiment takes the time TH until it starts the valve closing operation. In the shutoff valve 1, therefore, the time TH can be shortened to about a half of the time TK.

Figure 9:
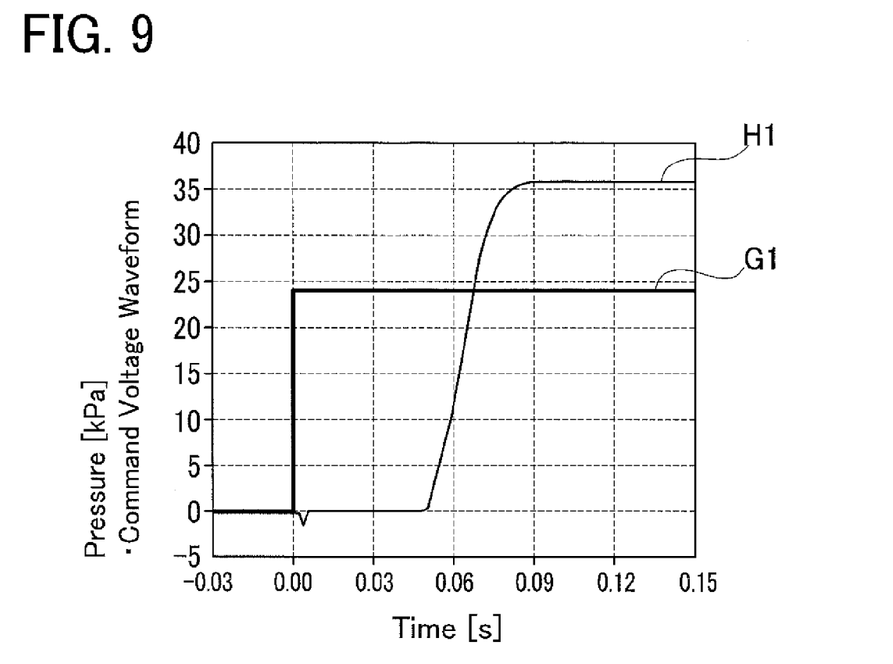
FIG. 9 is a graph showing repeatability of the opening operation of the air-driven shutoff valve.
Figure 10:
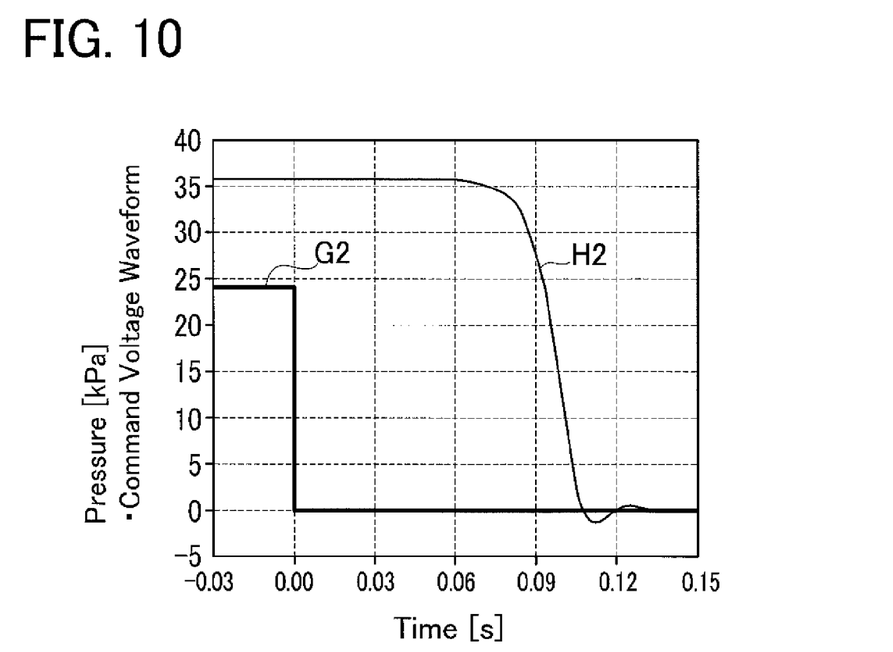
FIG. 10 is a graph showing repeatability of the closing operation of the air-driven shutoff valve.

The repeatability of the opening and closing times of the diaphragm valve element will be explained below referring to FIG. 9 showing the valve opening operation and FIG. 10 showing the valve closing operation. FIGS. 9 and 10 show measurement results of a pressure sensor provided on a secondary side of the air-driven shutoff valve 1. In FIGS. 9 and 10, a vertical axis indicates pressure [kPa]-command voltage waveform and a lateral axis indicates time.

When the operation signal is changed to a signal to start supplying the resist liquid (indicated by a thick line G1), the air-driven shutoff valve 1 is opened, allowing the resist liquid to flow from the inlet passage 112 to the outlet passage 113, the pressure on the secondary side rises (indicated by a line H1). When this valve opening operation is repeated ten times, variations in the timing of rising of the waveform and the inclination of the waveform are decreased to half as compared with the conventional air-driven shutoff valve. Similarly, when the operation signal is changed to a signal to stop supplying the resist liquid (indicated by a thick line G2), the air-driven shutoff valve 1 is closed, stopping the supply of the resist liquid, the pressure on the secondary side is lowered (indicated by a line H2). This is because the needle valve 35 of the air-driven shutoff valve 1 is fixed in advance in a predetermined position whereby many variation factors appearing in the control using the electropneumatic regulator can be eliminated, and thus the variation (range) can be reduced. Accordingly, the repeatability of the opening/closing time of the diaphragm valve element 12 is high during the valve opening and also during the valve closing. Specifically, since the driving of the air-driven shutoff valve 1 can be made under speed control using the fixed needle valve 35, not pressure control using the electropneumatic regulator, the opening/closing time of the diaphragm valve element 12 can be made with high repeatability.

Since the needle valve 35B is provided on the side close to the drive valve chamber 18 to control a flow rate of drive air to be supplied, it is possible to reduce the amount of air to be supplied necessary to open the diaphragm valve element 12. This can enhance the responsiveness. Further, since the needle valve 35A is provided on the side close to the opening/closing valve 45 to control a flow rate of drive air to be discharged, it is possible to increase the amount of air to be discharged necessary to close the diaphragm valve element 12 inclusive of the flow passage to the needle valve 35A. This can enhance the controllability of air discharge speed.

According to the air-driven shutoff valve 1 of the present embodiment as explained above, the response speed to bring the diaphragm valve element 12 into or out of contact with the valve seat 111 to close or open can be increased, resulting in a shortened treatment process time. The driving of the pilot opening/closing valve X1 can be made under speed control using the needle valve 35, not pressure control using the electropneumatic regulator. This can reduce variations in opening/closing times of the diaphragm valve element 12. It is further possible to reduce repeated variations in timing of starting/stopping supply of a fluid from the air-driven shutoff valve 1 to the suck-back valve and in flow rate of the fluid to be supplied. The motor 31 is a stepping motor and thus can simplify a control circuit and a control signal thereof, resulting in a compact and inexpensive pilot opening/closing valve X1. In a non-energized state, the retaining force of the male screw-threads 323 of the vertically-moveable member 32 and the O ring 41 can suppress a change in opening degree of the needle valve 35 and maintain the opening degree of the needle valve 35 at the predetermined position. The needle valve 35 can be electrically remote-controlled, so that the opening/closing speed of the air-driven shutoff valve 1 can be adjusted by remote control.

Second Embodiment

Figure 11:
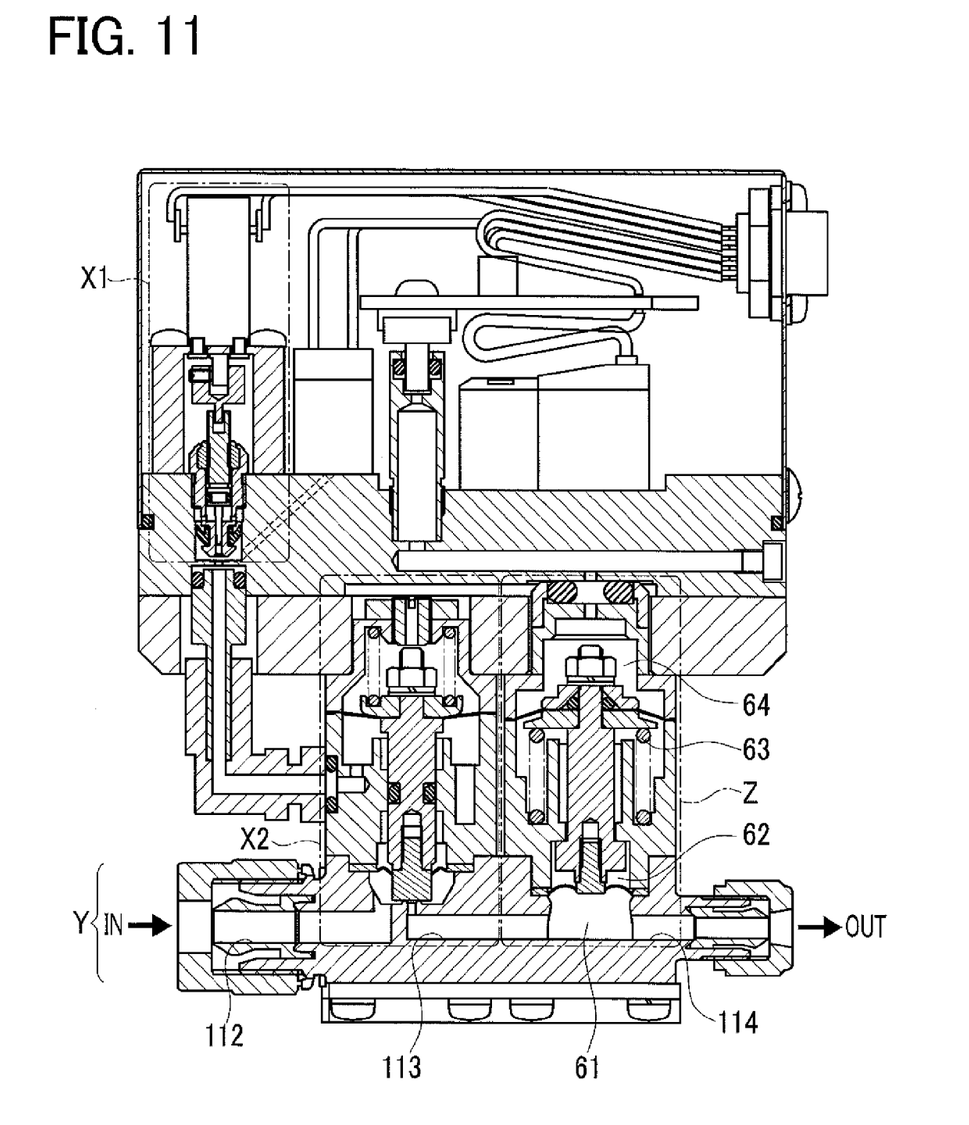
FIG. 11 is a cross sectional view of an air-driven shutoff valve and a suck-back valve which are integrally configured in a second embodiment.

An air-driven shutoff valve 1 of a second embodiment has a main configuration identical to that of the air-driven shutoff valve 1 of the first embodiment. Thus, the following explanation will be given to differences from the first embodiment. Similar or identical components or parts to those in the first embodiment are assigned the same reference signs and their explanations are omitted. FIG. 11 is a cross sectional view of the air-driven shutoff valve 1 in the second embodiment.

As shown in FIG. 11, the air-driven shutoff valve 1 is integrally configured with a suck-back valve Z to adjust a dripping state. The outlet passage 113 of the air-driven shutoff valve 1 is communicated with an inlet passage of the suck-back valve Z.

The suck-back valve Z includes a diaphragm valve element 62 forming a cavity 61. This diaphragm valve element 62 is biased upward by a spring 63 and includes a valve chamber 64 to which air will be supplied. When air is supplied to the valve chamber 64, the spring 63 is compressed, moving downward the diaphragm valve element 62, thereby decreasing the dimension of the cavity 62. On the other hand, when the air is discharged from the valve chamber 64, the spring 63 expands, increasing the dimension of the cavity 61. The suck-back valve Z is necessary only during valve closing. Thus, from the start of valve opening to the start of valve closing of the air-driven shutoff valve 1, the diaphragm valve element 62 is held downward to decrease the cavity 61 so that a suck-back operation (draw-back of a fluid) is enabled at the time of valve closing. Specifically, the suck-back valve Z is in a state enabling the suck-back operation in sync with closing of the air-driven shutoff valve.

As shown in FIG. 7, the speed of opening/closing operation of the air-driven shutoff valve 1 is faster than that of the conventional shutoff valve. One cycle including the opening and closing operations of the conventional shutoff valve and the operation of the suck-back valve (i.e., from changing of the operation signal to the end of suck-back operation) is indicated by time TL in FIG. 8. On the other hand, as shown in FIG. 7, one cycle including the opening and closing operations of the air-driven shutoff valve 1 of the second embodiment and the operation of the suck-back valve (i.e., from changing of the operation signal to the end of suck-back operation) is indicated by time TI shorter than the time TL. As above, the air-driven shutoff valve 1 can achieve the enhanced responsiveness, thereby enabling shortening the time required for one cycle. Herein, a difference between the time TI and the time TL is small. However, as the opening and closing operations are repeated, the difference is accumulated resulting in a large value. Accordingly, it is possible to shorten the treatment process time and improve the productivity. According to the air-driven shutoff valve 1, the operation timing of the air-driven shutoff valve 1 and the operation timing of the suck-back valve Z can be matched with each other. The air-driven shutoff valve 1 of the present embodiment provides high responsiveness and high repeatability and thus can repeatedly control the supply amount by the suck-back valve Z in a short time. Furthermore, differently from the electropneumatic regulator, the drive member 13 of the air-driven shutoff valve 1 does not generate heat and thus does not cause deformation of the resin main body and characteristics change of the resist liquid due to heat. This can stabilize the resist amount to be supplied.

Third Embodiment

Figure 12:
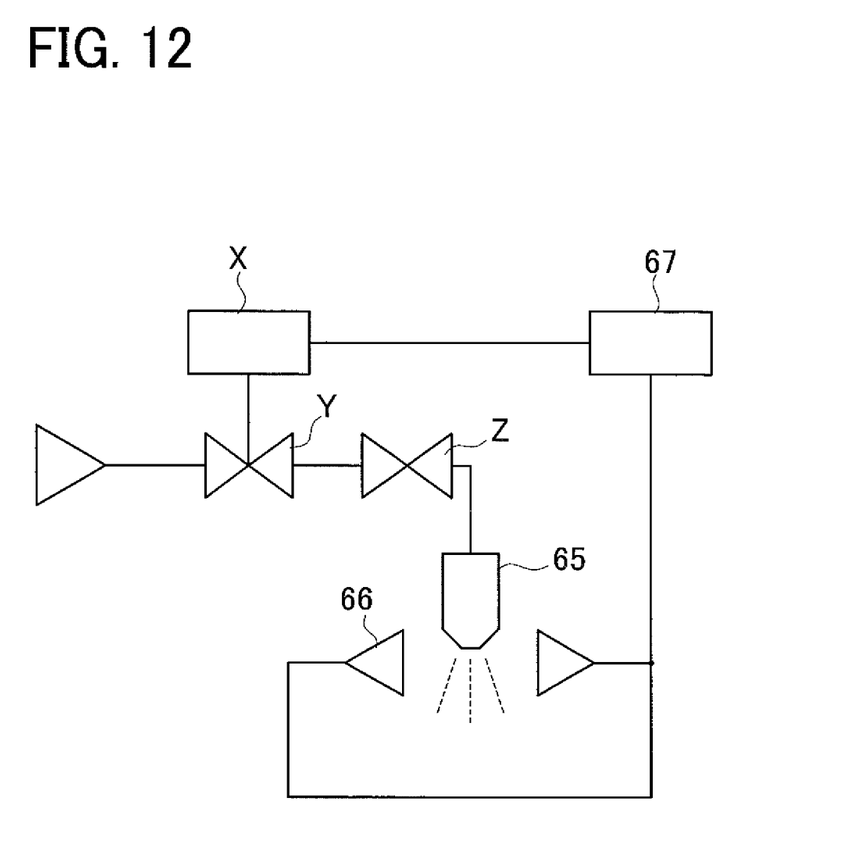
FIG. 12 is a circuit diagram of an air-driven shutoff valve in a third embodiment.

An air-driven shutoff valve 1 of a third embodiment has a main configuration identical to that of the air-driven shutoff valve 1 of the second embodiment. Thus, the following explanation will be given to differences from the second embodiment. Similar or identical components or parts to those in the second embodiment are assigned the same reference signs and their explanations are omitted. FIG. 12 is a circuit diagram of the air-driven shutoff valve 1 of the third embodiment.

A suck-back valve Z has an outlet passage 114 as shown in FIG. 11. This outlet passage 114 is connected to a nozzle 65 as shown in FIG. 12. A sensor 66 is placed at a distal end of the nozzle 65. The sensor 66 is connected to a controller 67 and configured to grasp (detect) a state of a fluid in the nozzle 65, that is, a fluid level protruding from an open tip of the nozzle 65. Based on this detected result, the controller 67 changes the opening degree of the first needle valve 35A to adjust the closing speed of the diaphragm valve element 12 or changes the opening degree of the second needle valve 35B to adjust the opening speed of the diaphragm valve element 12. Furthermore, the controller 67 calculates an outflow time of the resist liquid as an average at predetermined time intervals. When this calculated average falls outside an appropriate range, the controller 67 remotely controls the motor so that the average falls inside the appropriate range. This makes it possible to automatically adjust the opening degree of the needle valve 35 of the air-driven shutoff valve 1 by remote control.

The above embodiments are mere example and do not limit the invention. The present invention may also be embodied in other specific forms without departing from the essential characteristics thereof.

For instance, the above embodiments use the motor 31. In addition, a speed reducer may be attached to the motor 31 to finely adjust a rotation angle of the motor 31. Further, a thermal fuse may be attached to prevent excess rise of the temperature of the motor 31. The motor 31 may be a servo motor.

Although the above embodiments use air as a fluid for driving, for example, an inert gas may be used instead of air.

Although the above embodiments use a piston for driving, for example, an O ring sliding method may be adopted.

The above embodiments use the diaphragm valve element 12. Instead thereof, for example, a simple valve sheet having no diaphragm portion may be used.

REFERENCE SIGNS LIST

| 1 | Air-driven shutoff valve | 12 | Diaphragm valve element |
|---|---|---|---|
| 13 | Drive member | 31A | Motor |
| 31B | Motor | 33A | Check valve |
| 33B | Check valve | 35A | Needle valve |
| 35B | Needle valve | 36 | Second valve chamber |
| 37 | First valve chamber | 65 | Nozzle |
| 66 | Sensor | X | Shutoff-valve drive part |
| X1 | Pilot opening/closing valve | X2 | Air drive part |
| Y | Main valve part | Z | Suck-back valve |

What is claimed is:
1. A fluid-driven shutoff valve including:
a main body formed with an inlet passage and an outlet passage;
a valve seat formed in the main body;
a valve element movable into or out of contact with the valve seat;
a drive part integrally connected to the valve element; and
a pilot opening/closing valve configured to supply compressed fluid to drive the drive part, wherein
the pilot opening/closing valve includes:
(a) a first needle valve, a first motor configured to change an opening degree of the first needle valve, and a first check valve configured to allow the compressed fluid to flow only from a pilot opening/closing valve side to a drive part side, and
(b) a second needle valve, a second motor configured to change an opening degree of the second needle valve, and a second check valve configured to allow the compressed fluid to flow only from the drive part side to the pilot opening/closing valve side, wherein
each of the first and second needle valves includes a needle valve element and a needle valve seat, and
the shutoff valve further includes a vertically-moveable member placed between the first motor and the first needle valve, and a vertically-moveable member placed between the second motor and the second needle valve, each of the vertically-movable members configured to be moved by driving of the corresponding first and second motors to relatively move the respective needle valve elements with respect to the needle valve seats.

2. The fluid-driven shutoff valve according to claim 1, wherein
the drive part has a piston which is a diaphragm type, and the first and second motors are stepping motors.

3. The fluid-driven shutoff valve according to claim 1, wherein
the fluid-driven shutoff valve is integrally formed with a suck-back valve having an inlet passage, the outlet passage of the fluid-driven shutoff valve being communicated with the inlet passage of the suck-back valve, and
the fluid-driven shutoff valve is configured to be operated in sync with the suck-back valve.

4. The fluid-driven shutoff valve according to claim 3, further including:
a nozzle communicated with an outlet passage of the suck-back valve, and
a sensor placed at a distal end of the nozzle and configured to detect a state of a fluid in the nozzle, wherein
the shutoff valve is configured to change the opening degree of the first needle valve based on a detected result of the sensor to adjust a closing speed of the valve element, and
the shutoff valve is configured to change the opening degree of the second needle valve based on the detected result of the sensor to adjust an opening speed of the valve element.

5. The fluid-driven shutoff valve according to claim 2, wherein
the fluid-driven shutoff valve is integrally formed with a suck-back valve having an inlet passage, the outlet passage of the fluid-driven shutoff valve being communicated with the inlet passage of the suck-back valve, and
the fluid-driven shutoff valve is configured to be operated in sync with the suck-back valve.

6. The fluid-driven shutoff valve according to claim 5, further including:
a nozzle communicated with an outlet passage of the suck-back valve, and
a sensor placed at a distal end of the nozzle and configured to detect a state of a fluid in the nozzle, wherein
the shutoff valve is configured to change the opening degree of the first needle valve based on a detected result of the sensor to adjust a closing speed of the valve element, and
the shutoff valve is configured to change the opening degree of the second needle valve based on the detected result of the sensor to adjust an opening speed of the valve element.

* * * * *